United States Patent [19]

Mishio et al.

[11] Patent Number: 4,771,842
[45] Date of Patent: Sep. 20, 1988

[54] THREE-PART PROPELLER SHAFT ASSEMBLY INCORPORATING TWO HOOKE JOINTS HAVING THE SAME PHASES FLANKING CONSTANT VELOCITY JOINT, AND THIRD HOOKE JOINT ADJACENT TO ONE THEREOF AND HAVING 90 DEGREE OPPOSED PHASE

[75] Inventors: Yasuhiko Mishio; Hidetoshi Shimizu; Takashi Matsuda; Masaru Takeda, all of Toyota, Japan

[73] Assignee: Toyota Jidosha Kabushiki Kaisha, Aichi, Japan

[21] Appl. No.: 144,634

[22] Filed: Jan. 11, 1988

Related U.S. Application Data

[63] Continuation of Ser. No. 899,937, Aug. 25, 1986, abandoned.

[30] Foreign Application Priority Data

Jun. 9, 1985 [JP] Japan .................. 60-137181

[51] Int. Cl.$^4$ .......................................... B60K 23/00
[52] U.S. Cl. ...................... 180/75.2; 464/180
[58] Field of Search .............. 180/75.2, 245, 246, 180/233; 464/180

[56] References Cited

U.S. PATENT DOCUMENTS 3,089,559 5/1963 Rieck .................. 180/75.2

FOREIGN PATENT DOCUMENTS

60-234024 11/1985 Japan .
626487 7/1949 United Kingdom .............. 464/180

Primary Examiner—Kenneth R. Rice
Attorney, Agent, or Firm—Kenyon & Kenyon

[57] ABSTRACT

A vehicle has an engine and a driven differential. This three part type propeller shaft assembly includes a first propeller shaft element, a second propeller shaft element, and a third propeller shaft element. A first joint, which is a Hooke joint, rotationally couples the to a one end of the first propeller shaft element. A second joint rotationally couples the other end of the first propeller shaft element to a one end of the second propeller shaft element. A third joint rotationally couples the other end of the second propeller shaft element to a one end of the third propeller shaft element. And a fourth joint, which is a Hooke joint, rotationally couples the other end of the third propeller shaft element to the driven differential. Two bearing supports, one disposed near each end of the second propeller shaft element, rotatably support it from the vehicle body. One of the second joint and the third joint is a Hooke joint, and the other is a constant velocity type joint. The phase of the two Hooke joints which flank the constant velocity type joint on either side is set to be the same, while the phase of the other Hooke joint is set to differ by 90° from that common phase.

7 Claims, 7 Drawing Sheets

THREE-PART PROPELLER SHAFT ASSEMBLY INCORPORATING TWO HOOKE JOINTS HAVING THE SAME PHASES FLANKING CONSTANT VELOCITY JOINT, AND THIRD HOOKE JOINT ADJACENT TO ONE THEREOF AND HAVING 90 DEGREE OPPOSED PHASE

This application is a continuation of application Ser. No. 899,937, filed Aug. 25, 1986, now abandoned.

BACKGROUND OF THE INVENTION

The present invention relates to a three part type propeller shaft for a vehicle such as an automobile, and more particularly relates to such a three part type propeller shaft which incorporates three Hooke type universal joints and one constant velocity type universal joint, and which is notable for smoothness and lack of wobbling and vibration.

As a propeller shaft assembly for a vehicle such as an automobile, it has long been conventional to employ a single part propeller shaft coupled at its front end by a first Hooke joint to the power output shaft of the transmission and at its rear end by a second Hooke joint to the power input shaft of the differential device of the vehicle. Further, it is known to utilize a two part propeller shaft assembly made up from two propeller shaft elements coupled together by a second Hooke joint, and as before coupled at its front end by a first Hooke joint to the power output shaft of the transmission and at its rear end by a third Hooke joint to the power input shaft of the differential device of the vehicle; this type of two part propeller shaft assembly was introduced in order to reduce the vibration and consequent noise level during high speed operation.

Further, recently there have been developed so called full time four wheel drive type vehicles, which are provided with a central differential apparatus for distributing power between the front wheels and the rear wheels of the vehicle. Such a central differential apparatus is typically provided with a selectably actuatable locking mechanism for selectably preventing it from providing differential action, at the will of the vehicle driver. Further, there are also known four wheel drive vehicles which can be selectably switched to two wheel drive operational mode or four wheel drive operational mode. Both these types of vehicles may typically include a transversely mounted engine whose crankshaft and rotational power axis extends transversely to the longitudinal axis of the body of the vehicle. In four wheel drive type vehicles with such a transversely mounted engine arrangement, the distance between the output side of the engine and transmission unit and the front end of the differential device for the rear wheels becomes even greater than heretofore, and accordingly the propeller shaft inevitably becomes longer. Accordingly, various types of three part propeller shaft assembly have begun to be utilized in such four wheel drive transverse engine type vehicle configurations. Such three part propeller shaft assemblies include three propeller shaft elements and four universal joints.

In more detail, such a three part propeller shaft assembly typically includes a first or front propeller shaft element rotationally coupled at its front end by a first universal joint to the rear end of the power output shaft of the engine, a second or center propeller shaft element rotationally coupled at its front end by a second universal joint to the rear end of said first propeller shaft element, and a third propeller shaft element rotationally coupled at its front end by a third universal joint to the rear end of said second propeller shaft element and rotationally coupled at its rear end by a fourth universal joint to the front end of the input shaft of the differential for the rear wheels of the vehicle. And the center propeller shaft element is typically rotatably and elastically mounted to the lower side of the floor of the vehicle body by two elastic center shaft bearing supports, one near each of its ends; this is done in order positively to support said center propeller shaft element and to limit the number of degrees of freedom of the propeller shaft assembly as a whole. With this kind of three part propeller shaft assembly, in order to maximize the space within the passenger compartment of the vehicle and so as to minimize the irregularity in the floor of the vehicle caused by the provision of the propeller shaft assembly passing thereunder from the front of the vehicle to the rear, it is known for the three propeller shaft elements and the four joints to be extended, not in a straight line, but with each joint bent through its own characteristic angle, and typically with the center propeller shaft element held lower than the other two propeller shaft elements. Also, in order to absorb the rotational fluctuations created at the Hooke joints, it is typical to dispose adjacent Hooke joints in opposite phases.

A problem that has occurred with such a system is as follows. In the above outlined construction, generally during the high speed operational condition the vibration level and the noise level are low, but upon occasion a new type of vibration noise phenomenon not seen in the case of vehicles provided with single part propeller shaft assemblies or vehicles provided with two part propeller shaft assemblies arises. This vibrational noise is considered to be caused by rotational fluctuations originating in the propeller shaft elements.

As is per se known, when a Hooke joint is bent through an angle and is transmitting load from one propeller shaft element to another, a force couple is created. Thus, wobbling and vibration are caused in the propeller shaft elements due to secondary force couples arising in the joint angles present between the three propeller shaft elements. In particular, when a full time four wheel drive vehicle including such a three part type propeller shaft assembly is operated with the central differential apparatus in the locked condition, or when a part time four wheel drive vehicle likewise incorporating such an assembly is operated in the four wheel drive condition, then the engine and the rear wheel differential device both move somewhat due to wheel torque set up due to the rotational difference between the front wheels and the rear wheels of the vehicle, and the rear end of the engine power output shaft and the front end of the power input shaft for the rear wheel differential device both tend to be pivoted upwards. The angles of the various joints of the three part type propeller shaft assembly are thereby increased, and the above explained problem of wobbling vibration and noise due to secondary force couples is accentuated.

One possible countermeasure for coping with this problem of wobbling vibration and noise due to secondary force couples would be to set the spring constants of the two elastic center shaft bearing supports for the center propeller shaft element to be greater, i.e. to make said center shaft bearing supports stiffer by, for example, using a stiffer rubber element in their constructions. Although this increasing of the spring constants of the two elastic center shaft bearing supports is effective for preventing or reducing such wobbling vibration and consequent noise, the general noise level as well as the booming noise level within the passenger compartment are undesirably increased, and this in practice makes such a solution not practicable. As a result, substantial reduction by this method of wobbling vibration and consequent noise is not possible. Furthermore, increasing the stiffness of the two elastic center shaft bearing supports has the further deleterious effect of reducing their durability.

SUMMARY OF THE INVENTION

Accordingly, it is the primary object of the present invention to provide a three part propeller shaft assembly, which can reduce wobbling vibration and noise due to secondary force couples.

It is a further object of the present invention to provide such a three part propeller shaft assembly, which does not cause an undesirable increase of noise such as booming noise within the passenger compartment.

It is a further object of the present invention to provide such a three part propeller shaft assembly, which is particularly suitable for use with a four wheel drive type of vehicle.

It is a further object of the present invention to provide such a three part propeller shaft assembly, which is particularly suitable for use with a full time four wheel drive type of vehicle, especially when a central differential device thereof is set to the locked condition.

It is a further object of the present invention to provide such a three part propeller shaft assembly, which has good durability.

It is a further object of the present invention to provide such a three part propeller shaft assembly, which is economical to manufacture.

According to the most general method aspect of the present invention, these and other objects are attained by, for a vehicle comprising a means for providing rotational power, a means for receiving rotational power and transmitting it to a road surface, and a body: a three part type propeller shaft assembly, comprising: a first propeller shaft element, a second propeller shaft element, and a third propeller shaft element; a first joint, which is a Hooke joint, and which rotationally couples said means for providing rotational power to a one end of said first propeller shaft element; a second joint, which rotationally couples the other end of said first propeller shaft element to a one end of said second propeller shaft element; a third joint, which rotationally couples the other end of said second propeller shaft element to a one end of said third propeller shaft element; a fourth joint, which is a Hooke joint, and which rotationally couples the other end of said third propeller shaft element to said means for receiving rotational power and transmitting it to a road surface; and: two means for rotatably supporting said second propeller shaft element from said body, one disposed near each end of said second propeller shaft element; one of said second joint and said third joint being a Hooke joint, and the other being a constant velocity type joint; and the phase of the two said Hooke joints which flank said constant velocity type joint on either side being set to be the same, while the phase of the other said Hooke joint is set to differ by 90° from said common phase. The second joint may be the one which is a Hooke joint, in which case the third joint will be the one which is a constant velocity type joint; or alternatively the third joint may be the one which is a Hooke joint, in which case the second joint will be the one which is a constant velocity type joint.

According to such a structure, supposing that it is the second joint which is a Hooke joint, in which case the third joint will be a constant velocity type joint, then the principal forces which tend to wobble the rear center shaft bearing support are a secondary couple on the output side of the second universal joint and a secondary couple on the input side of the fourth universal joint, and these forces push the rear center shaft bearing support in the same direction. Since the second Hooke joint and the fourth Hooke joint are set to the same phase, the phases of the output side secondary couple and the input side secondary couple are offset by 90°, and accordingly these forces tend to cancel one another out, and thus the wobbling vibration and noise due to secondary force couples on the rear center shaft bearing support is minimized. On the other hand, the principal forces which tend to wobble the front center shaft bearing support are a secondary couple on the output side of the first universal joint and a secondary couple on the input side of the second universal joint, and these forces push the front center shaft bearing support in opposing directions. Since the first Hooke joint and the second Hooke joint are set to have phases offset by 90°, the phases of the output side secondary couple and the input side secondary couple are offset by 90°, and accordingly these forces tend to cancel one another out, and thus the wobbling vibration and noise due to secondary force couples on the front center shaft bearing support, also, is minimized. Thereby, it is also possible to set the spring constants of the two elastic center shaft bearing supports for the center propeller shaft element to be relatively low, which enables the reduction of noise such as booming noise in the passenger compartment and further increases the durability of said two elastic center shaft bearing supports for the center propeller shaft element.

BRIEF DESCRIPTION OF THE DRAWINGS

The present invention will now be described with respect to the preferred embodiments thereof, and with reference to the illustrative drawings appended hereto. It should be clearly understood, however, that the description of the embodiments, and the drawings, are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the set of figures relating to one preferred embodiment and like parts and gaps and spaces and so on in sets of figures relating to differing preferred embodiments; and:

DESCRIPTION OF THE PREFERRED EMBODIMENTS

Figure 6:
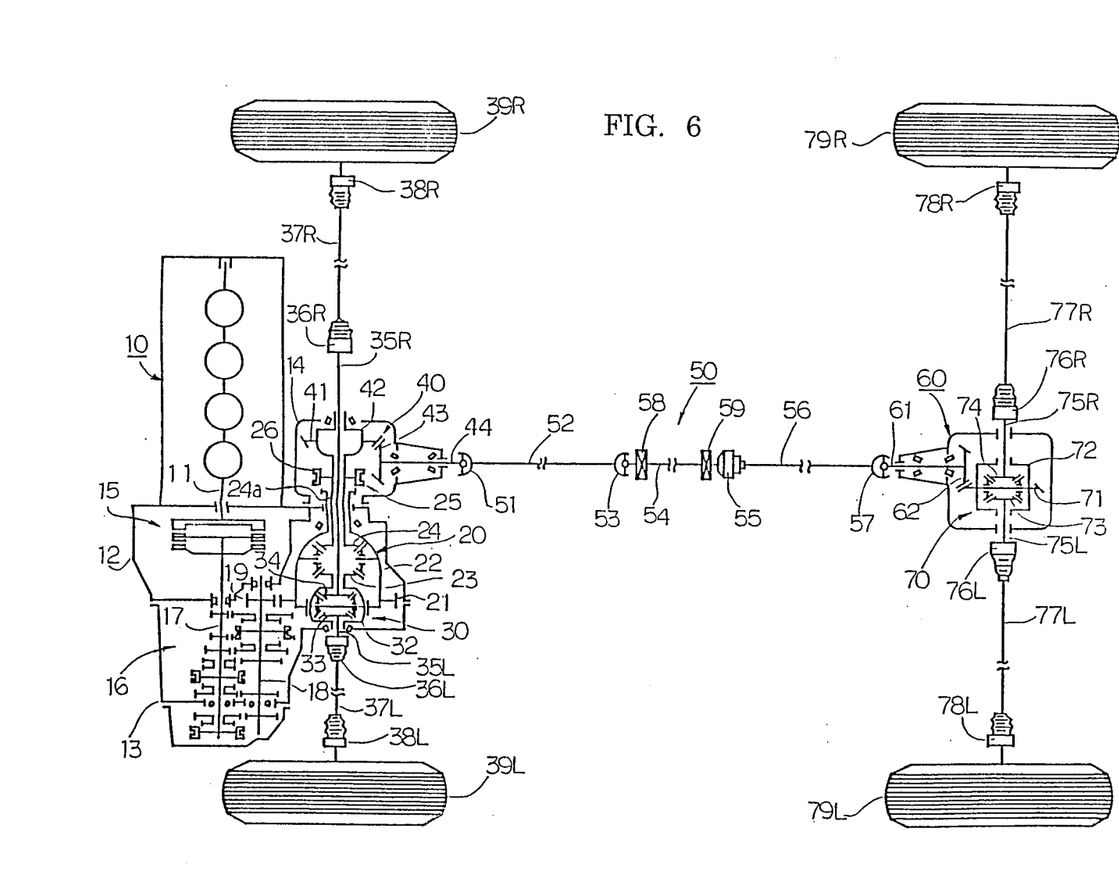
FIG. 6 is a schematic skeleton plan view showing the FIG. 1 power train of the automotive vehicle incorporating said first preferred embodiment of the three part propeller shaft assembly according to the present invention, and particularly showing constructional details of other power transmission devices incorporated in said power train.

The present invention will now be described with reference to the preferred embodiments thereof, and in conjunction with the appended drawings. FIG. 6 shows in schematic skeleton plan view a power train of a four wheel drive type automotive vehicle incorporating the first preferred embodiment of the three part propeller shaft assembly of the present invention; this automotive vehicle in fact is of the so called full time 4WD type, and has an engine transversely mounted in its engine room. In this figure, the reference numeral 10 denotes said transversely mounted engine, while 15 denotes a clutch device driven from said engine 10, 16 denotes a transmission mechanism including a gear transmission mechanism which can be set to any one of a plurality of speed stages, 20 denotes a central differential device, 30 denotes a front wheel differential device, 40 denotes a rear wheel drive direction altering mechanism, 50 denotes the aforementioned first preferred embodiment of the three part propeller shaft assembly of the present invention, and 70 denotes a rear wheel differential device, which is mounted inside a casing 60.

In more detail, the engine 10 is as abovementioned transversely mounted in the engine room, not particularly shown, of the vehicle, with the crank shaft 11 of said engine 10 extending transversely to the longitudinal axis of the vehicle. To one end of the engine block of the engine 10 there is fixed a transaxle and clutch casing 12, and to the end of said transaxle casing 12 opposite from the engine 10 there is mounted a transmission housing 13. And on the engine 10 side of the transaxle and clutch casing 12, but somewhat rearwards displaced from said engine 10, there is fixed a transfer casing 14.

The crank shaft 11 is drivingly coupled to a rotational power input member of the coaxially disposed clutch device 15, and a rotational power output member of said clutch device 15 is drivingly coupled to a rotational power input member or input shaft 17 of the similarly coaxially disposed transmission device 16. A rotational power output member or output shaft 18 of said transmission device 16 is rotatably mounted in the transmission housing 13 and is disposed in parallel with said input shaft 17, and further has a power output gear wheel 19 fixedly mounted on it. The clutch device 15 and the transmission device 16 are of per se conventional types and function in per se conventional ways; accordingly, the details of their structure and functioning will not be further discussed in this specification.

In the transaxle casing 12 there are further fitted the central differential device 20 and the front wheel differential device 30. The central differential device 20 is of a per se known bevel gear type, and divides the rotational power inputted to it from the engine 10 via the clutch device 15 and the transmission device 16 between a front wheel transmission assembly and a rear wheel transmission assembly. In detail, this central differential device 20 comprises a differential case 22 and a final reduction gear or ring gear 21, supported on said differential case 22, which is constantly meshingly engaged with the power output gear wheel 19 of the transmission device 16. Two differential pinion gears, not denoted by any reference numerals, are rotatably mounted to said differential case 22 about an axis transverse to the axis of the final reduction ring gear 21, and with these differential pinion gears there are meshed a left side driven gear wheel 23 and a right side driven gear wheel 24; thus, differential action is available for distributing rotational power between said left and right side driven gear wheels 23 and 24. The left side driven gear wheel 23 is integrally formed on the end of a shaft the other end of which is integrally formed with a differential casing 32 of the front wheel differential device 30, while the right side driven gear wheel 24 is integrally formed on the end of a hollow shaft member 24a which extends out from the transaxle casing 12 to the interior of the transfer casing 14.

The front wheel differential device 30 is provided on one side (the left side with relation to the longitudinal axis of the vehicle) of the central differential device 20, and is coaxial therewith. The differential casing 32 of said front wheel differential device 30 is, as implied above, directly rotationally driven from the left side driven gear wheel 23 of said central differential device 20, and carries two differential pinion gears, not denoted by any reference numerals, which are rotatably mounted to said differential casing 32 about an axis transverse to the main longitudinal axis of said front wheel differential device 30. With these differential pinion gears there are meshed a left side driven gear wheel 33 and a right side driven gear wheel 34; thus, differential action is available for distributing rotational power between said left and right side driven gear wheels 33 and 34. The left side driven gear wheel 33 is rotationally coupled, via a relatively short left side front vehicle axle 35L, a left side slide type constant velocity joint 36L, a left side drive shaft 37L, and a left side fixed type constant velocity joint 38L, to the left front wheel 39L of the vehicle. Similarly, the right side driven gear wheel 34 is rotationally coupled, via a relatively long right side front vehicle axle 35R which extends completely through the central differential device 20 and through the rear wheel drive direction altering mechanism 40, and via a right side slide type constant velocity joint 36R, a right side drive shaft 37R, and a right side fixed type constant velocity joint 38R, to the right front wheel 39R of the vehicle. Thereby, rotational power from the engine 10 of the vehicle is transmitted, after being provided with differential action with respect to division between the front and the the rear wheels of the vehicle by the central differential device 20, to said left and right front wheels 39L and 39R, with differential action being provided between said left and right front wheels 39L and 39R by this front wheel differential device 30.

Inside the transfer casing 14 there is provided the rear wheel drive direction converting gear mechanism 40, and there is also provided a selectively actuatable locking mechanism 25 incorporating a locking sleeve 26 spline fitted over the hollow shaft member 24a extending out from the transaxle casing 12, which can either lock the right side driven gear wheel 24, which is integrally formed together with said hollow shaft member 24a, to the differential case 22 of the central differential device 20, or can allow these members to be rotationally free with respect to one another. And the rear wheel drive direction converting gear mechanism 40 comprises a mounting case 42 on the periphery of which there is provided a ring gear 41, said mounting case 42 being rotationally drivingly coupled to the end of the hollow shaft member 24a and driven thereby. With the ring gear 41 there is constantly meshed a driven pinion gear 43 fixedly mounted on the forward end of a driven pinion gear shaft 44, and thereby the directional axis of the driving rotational force for the rear wheels of the vehicle is converted from being transverse to the vehicle body to being longitudinal to said vehicle body.

This driving rotational force for the rear wheels of the vehicle is then transmitted from the rear end of this driven pinion gear shaft 44, via the first preferred embodiment of the three part propeller shaft assembly of the present invention herein denoted as 50 which will be described in detail shortly, to the forward end of a drive pinion gear shaft 61, on the rear end of which there is fixedly mounted a drive pinion gear 62 which is constantly meshed with a ring gear 71 which is provided on the periphery of a differential case 72 of the rear wheel differential device 70, which is accordingly rotationally driven by said ring gear 71. This differential case 72 carries two differential pinion gears, not denoted by any reference numerals, which are rotatably mounted to the differential casing 72 about an axis transverse to the main longitudinal axis of said rear wheel differential device 70. With these differential pinion gears there are meshed a left side driven gear wheel 73 and a right side driven gear wheel 74; thus, differential action is available for distributing rotational power between said left and right side driven gear wheels 73 and 74. The left side driven gear wheel 73 is rotationally coupled, via a left side rear vehicle axle 75L, a left side slide type constant velocity joint 76L, a left side drive shaft 77L, and a left side fixed type constant velocity joint 78L, to the left rear wheel 79L of the vehicle. Similarly, the right side driven gear wheel 74 is rotationally coupled, via a right side rear vehicle axle 75R, a right side slide type constant velocity joint 76R, a right side drive shaft 77R, and a right side fixed type constant velocity joint 78R, to the right rear wheel 79R of the vehicle. Thereby, rotational power transmitted through the propeller shaft assembly 50 from the engine 10 of the vehicle is transmitted, after being provided with differential action with respect to division between the front and the rear wheels of the vehicle by the central differential device 20, to said left and right rear wheels 79L and 79R, with differential action thus being provided between said rear wheels 79L and 79R by this rear wheel differential device 70.

Figure 1:
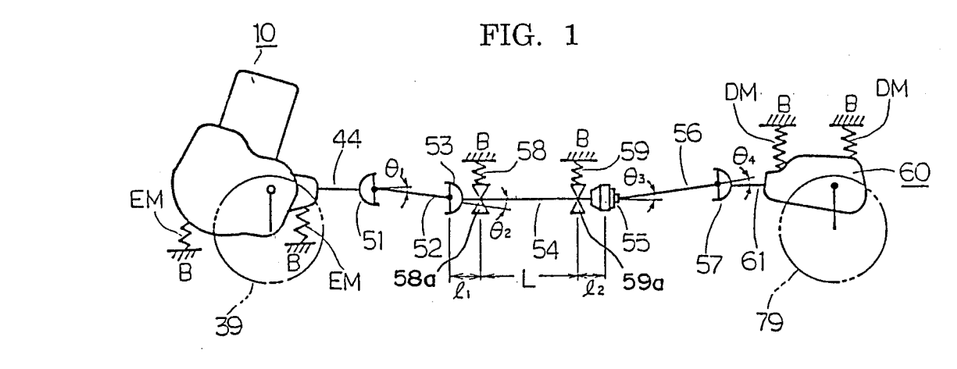
FIG. 1 is a schematic skeleton side view showing the first preferred embodiment of the three part propeller shaft assembly of the present invention as fitted to the power train of an automotive vehicle.

Now, the first preferred embodiment of the three part propeller shaft assembly of the present invention, herein denoted as 50, will be described, with particular reference to FIGS. 1 and 2 which are skeletal views thereof in two different operational conditions, and with reference to FIG. 3 which shows said first preferred embodiment from the side. This propeller shaft assembly 50 drivingly couples the rear end of the driven pinion gear shaft 44 to the front end of the drive pinion gear shaft 61, and comprises, in order from the front to the rear of the vehicle: a first joint 51 which is a Hooke joint, a front propeller shaft element 52, a second joint 53 which is also a Hooke joint, a center propeller shaft element 54, a third joint 55 which is a constant velocity joint of a type which will be described shortly, a rear propeller shaft element 56, and a fourth joint 57 which is also a Hooke joint. The three part propeller shaft assembly 50 of the present invention also comprises supports 58 and 59 which are provided near the front and rear ends of the center propeller shaft element 54 and elastically support said center propeller shaft element 54 from the floor of the vehicle body (denoted as "B" in the drawings) with a certain degree of resilience, while allowing said center propeller shaft element 54 to be free to rotate about its central axis. The first Hooke joint 51 rotationally couples the front end of the front propeller shaft element 52 to the rear end of the driven pinion gear shaft 44, while allowing a certain angular inclination $\theta1$ to be present between their central longitudinal axes. The second Hooke joint 53 rotationally couples the front end of the central propeller shaft element 54 to the rear end of the front propeller shaft element 52, while allowing a certain angular inclination $\theta2$ to be present between their central longitudinal axes. The third constant velocity joint 55 rotationally couples the front end of the rear propeller shaft element 56 to the rear end of the central propeller shaft element 54, while allowing a certain angular inclination $\theta3$ to be present between their central longitudinal axes. And the fourth Hooke joint 57 rotationally couples the front end of the drive pinion gear shaft 61 to the rear end of the rear propeller shaft element 56, while allowing a certain angular inclination $\theta4$ to be present between their central longitudinal axes. And the supports 58 and 59 serve for supporting the central propeller shaft element 54 and for stopping the whole construction from flopping about and thrashing around, i.e. from having too many degrees of freedom; albeit with a certain amount of resilience as will be explained later.

The third joint 55 is a constant velocity joint as mentioned above, while Hooke joints are utilized for the first, the second, and the fourth joints 51, 53, and 57. Particularly according to the present inventive concept, the second Hooke joint 53 and the fourth Hooke joint 57, which are the ones which flank the third constant velocity joint 55 on either side, are set to have equivalent (i.e. identical) phases, while on the other hand the first Hooke joint 51, which is the remaining Hooke joint which is the only one thereof not neighboring to the third constant velocity joint 55, is set to have a phase opposite to the common phase of said second Hooke joint 53 and said fourth Hooke joint 57. Thus, the phases of the first Hooke joint 51, the second Hooke joint 53, and the fourth Hooke joint 57 are respectively set to 90°, 0°, and 0°.

Now, an explanation will be given of the structure of the slide type constant velocity joint 55, which is the third joint in series along the first preferred embodiment of the three part propeller shaft assembly 50 of the present invention as seen from its front end to its rear end. In this first preferred embodiment, as seen in longitudinal sectional view in FIG. 4 and in transverse sectional view in FIG. 5, a so called Cross Groove Universal joint or VL (V type loose) joint, which has superior constant velocity characteristics, is used for the slide type constant velocity joint.

Figure 4:
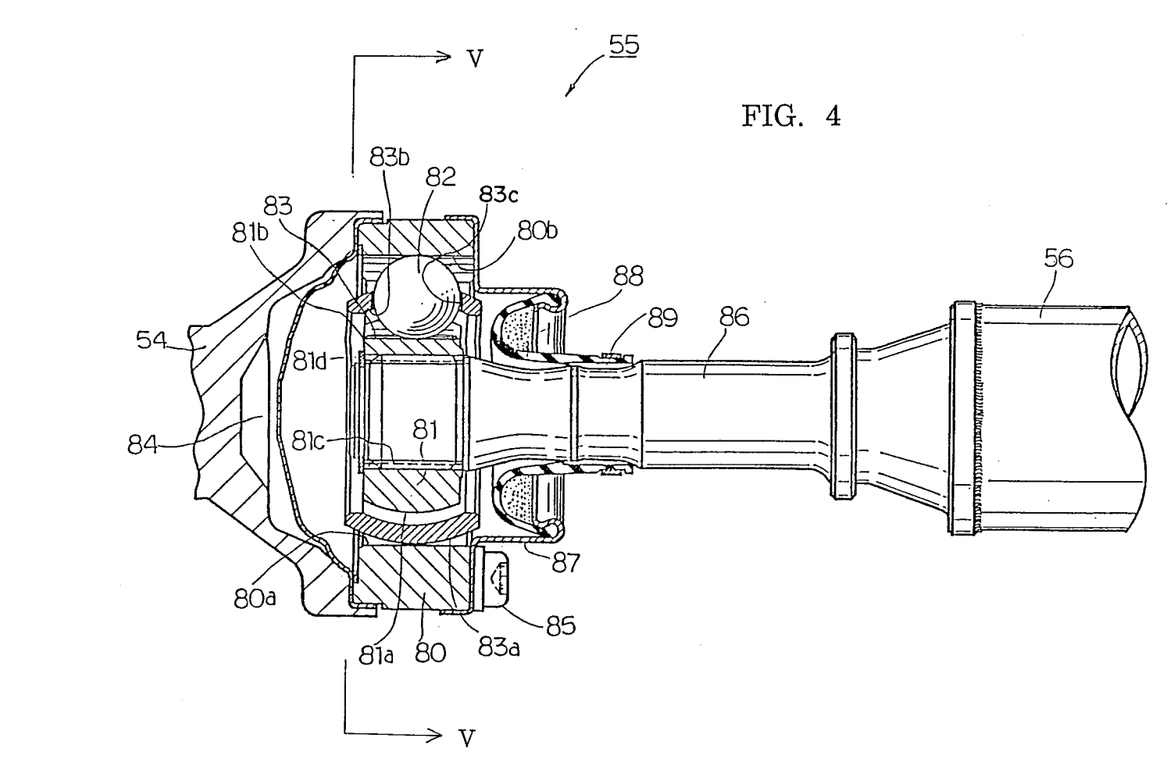
FIG. 4 is a longitudinal cross sectional view showing the principal parts of a constant velocity joint utilized in said first preferred embodiment three part propeller shaft assembly.
Figure 5:
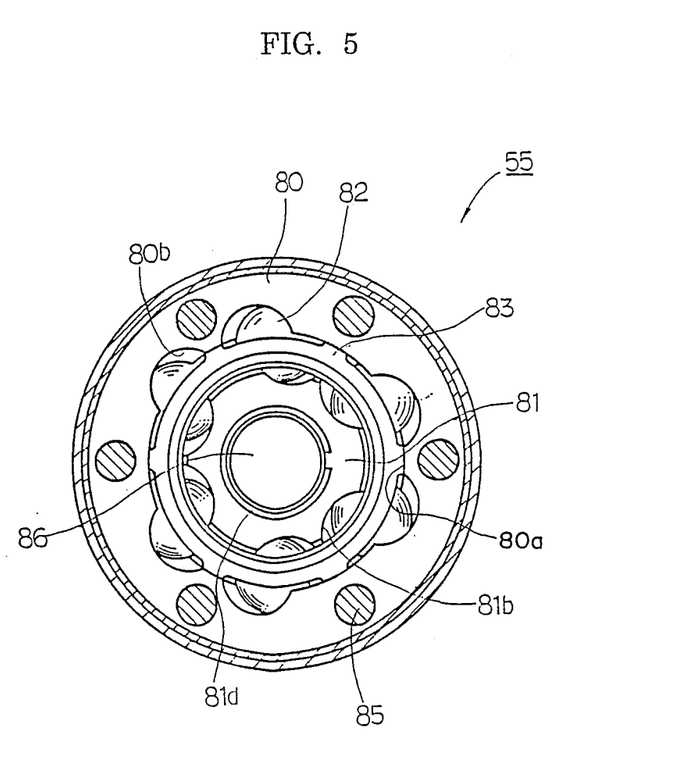
FIG. 5 is a transverse cross sectional view of said constant velocity joint of said first preferred embodiment three part propeller shaft assembly, taken in a plane shown by the arrows V—V in FIG. 4.

As is per se known, this Cross Groove Universal joint 55 comprises an outer race 80, an inner race 81, a plurality of torque transmission balls 82, and a cage 83. In more detail, the outer face 80 is formed with a cylindrical inner circumferential surface 80a in which six (in this embodiment) ball channels 80b are formed. And the inner race 81 is formed with a part spherical outer circumferential surface 81a on which six ball channels 81b are formed in positions generally corresponding to the ball channels 80b formed in the cylindrical inner circumferential surface 80a of the outer race 80. These ball channels 80a and 81a are formed as pairs on the opposing cylindrical surfaces in such a manner as to incline at equal angles in opposite directions. And six torque transmission balls 82 are rollably fitted between the outer race 80 and the inner race 81, each rolling within one of the ball channels 80a of said outer race 80 and within an opposing one of the ball channels 81a of said inner race 81. Further, the cage 83 is formed in the shape of a central frustum of a hollow sphere, having an outer spherical frustum surface 83a and an inner spherical frustum surface 83b, and is received inside the cylindrical inner circumferential surface 80a of the outer race 80 with its said outer spherical frustum surface 83a touching said cylindrical inner circumferential surface 80a of said outer race 80, and outside the part spherical outer circumferential surface 81a of the inner race 81 with a certain gap being left therebetween to allow free mutual relative motion. Six apertures 83b are formed in the cage 83 at equal intervals therearound, and receive the six torque transmission balls 82 and hold them in the ball channels 80a of the outer race 80 and the ball channels 81a of the inner race 81 while allowing them to move therein. And the center of the inner and outer spherical frustum surfaces of the cage 83 always is coincident with the center of the spherical surface of the inner race 81, and each torque transmission ball 82 is always held by said cage 83 with its outer surface portion rolling in its one of the ball channels 80a of the outer race 80, with its inner surface portion rolling in its one of the ball channels 18a of said inner race 81, and with its center always approximately lying on the plane transverse to the central axis of symmetry of said cage 83 and axially midway therealong.

The outer race 81 is secured at the rear end of the center propeller shaft element 54 by a retainer 84 and by bolts 85 only one of which can be seen in FIG. 4, and the inner race 81 is secured and integrally to a stub shaft 86 by means of splines 81c formed on a cylindrical inner surface of said inner race 81, and by means of a snap ring 81d. The stub shaft 86 is secured integrally by welding to the front end of the rear propeller shaft element 56. And a boot 88 is furnished between the stub shaft 86 and a cover 87 press fitted to the outer circumference of the outer race 80; 89 denotes an air hole. The space within this constant velocity Cross Type Universal joint 55 is filled with lubricating grease. According to the per se known operation of said constant velocity Cross Type Universal joint 55, the center propeller shaft element 54 and the rear propeller shaft element 56 are drivingly rotationally coupled together in a constant velocity type manner, and at the same time a certain desirable amount of relative axial sliding is allowed between said center propeller shaft element 54 and said rear propeller shaft element 56.

Referring again to FIGS. 1 and 2, the engine 10 and the transaxle and clutch casing 12 are elastically mounted to the body B of the vehicle by engine mounts denoted as EM, and the rear differential device casing 60 is elastically mounted to said body B of the vehicle by differential mounts denoted as DM. Further, the front end of the center propeller shaft element 54 is rotatably mounted in a front propeller shaft support bearing 58a which is elastically supported from said body B of the vehicle by a center shaft front bearing support 58, while similarly the rear end of said center propeller shaft element 54 is rotatably mounted in a rear propeller shaft support bearing 59a which is elastically supported from said body B of the vehicle by a center shaft rear bearing support 59. Herein, the angle between the front end of the front propeller shaft element 52 and the rear end of the driven pinion gear shaft 44, i.e. the bending angle of the first Hooke joint 51, will be denoted as $\theta 1$; the angle between the front end of the central propeller shaft element 54 and the rear end of the front propeller shaft element 52, i.e. the bending angle of the second Hooke joint 53, will be denoted as $\theta 2$; the angle between the front end of the rear propeller shaft element 56 and the rear end of the central propeller shaft element 54, i.e. the bending angle of the third constant velocity joint 55, will be denoted as $\Theta 3$; and the angle between the front end of the drive pinion gear shaft 61 and the rear end of the rear propeller shaft element 56, i.e. the bending angle of the fourth Hooke joint 57, will be denoted as $\theta 4$; these angles are all positive with the sense indicated in FIG. 1, in order for the propeller shaft assembly according to the present invention to drop downwards as it passes under the floor of the passenger compartment of the vehicle, thus allowing said passenger compartment to be as capacious as possible and minimizing the irregularity of the floor thereof.

Now, an explanation of the operation of this first preferred embodiment of the three part propeller shaft assembly according to the present invention will be provided.

Figure 2:
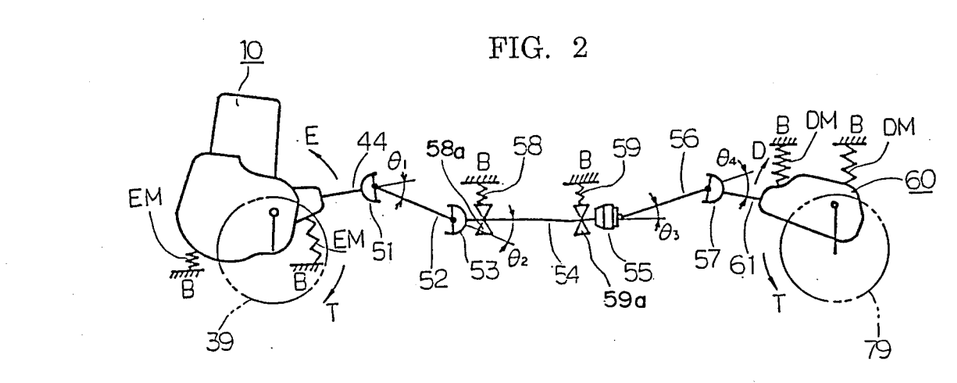
FIG. 2 is a schematic skeleton side view similar to FIG. 1, showing said first preferred embodiment of the three part propeller shaft assembly of the present invention in its stressed operational condition, with a central differential apparatus of a full time 4WD type transmission mechanism, with which the power train of the automotive vehicle is equipped and which drives said propeller shaft assembly, being set to the locked condition.
Figure 3:
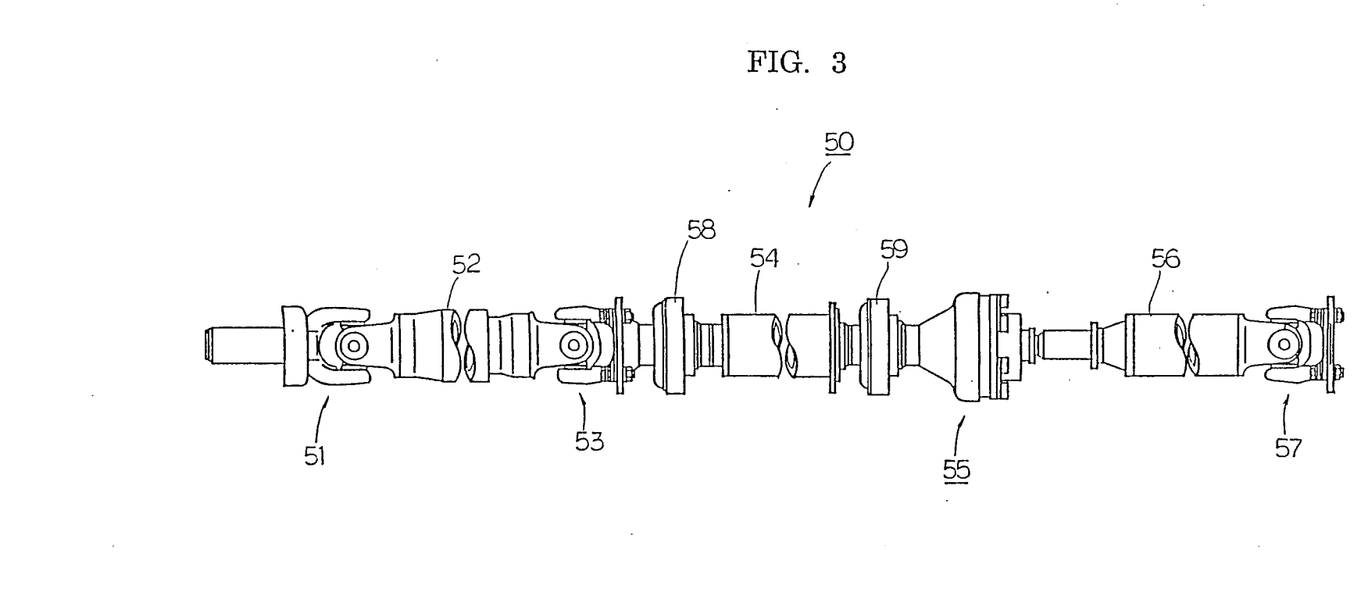
FIG. 3 is an external side view of said first preferred embodiment of the three part propeller shaft assembly of the present invention, as seen in isolation.

When the vehicle is being operated to be driven along the road with the central differential device 20 in the locked operational condition so that said central differential device 20 cannot perform differential action, then in order not to produce any difference in rotational speed between the front and the rear wheels of the vehicle a torque denoted as T is set up as acting upon the front wheels 39 and the engine 10 and the rear wheels 79 and the rear differential device 60, as shown in FIG. 2, and torque is set up upon the driven pinion gear shaft 44, which acts as the output shaft of the transaxle unit on the front, center, and rear propeller shaft elements 52, 54, and 56, and upon the drive pinion gear shaft 61 which acts a a rotational power input shaft for the differential device 60. This torque causes the engine 10 with the transaxle casing as a whole to rotate counterclockwise as shown by the arrow E in FIG. 2, and also causes the differential device 60 as a whole to rotate clockwise as shown by the arrow D also in that figure. In other words, the rear end of the driven pinion gear shaft 44 and the front of the drive pinion gear shaft 61 are both raised, as can be seen by contrasting FIG. 2 with FIG. 1. As a result, the joint angles $f1$ through $θ4$ of the first through the fourth joints 51, 53, 55, and 57 of the propeller shaft assembly are all increased (taken in the sense of the figures) and accordingly the secondary coupling forces on the front, center, and rear propeller shaft elements 52, 54, and 56 at these joints due to the torque are increased.

Next, the secondary coupling forces which tend to displace the center shaft front bearing support 58 and the center shaft rear bearing support 59 will be considered.

First, a consideration of the forces acting on the center shaft rear bearing support 59 from the point of view of the equilibrium of the rotational moment of the center shaft front bearing support 58 indicates that the secondary coupling force originating on the input (front) side of the first Hooke joint 51 is transmitted through the engine 10 to the engine mounts EM, and therefore does not substantially act upon the center shaft rear bearing support 59. Further, the secondary forces originating at the output (rear) side of the first Hooke joint 51 and at the input (front) side of the second Hooke joint 53 respectively transmit forces to said second Hooke joint 53; however, since the distance $1_1$ between said second Hooke joint 53 and the center shaft front bearing support 58 (as indicated in the figures) is much shorter than the distance between the distance L between said center shaft front bearing support 58 and the center shaft rear bearing support support 59, and accordingly the force acting upon said center shaft rear bearing support 59 is not very great. And, yet further, the input (front) side and the output (rear) side secondary coupling forces created at the third constant velocity joint 55 do not substantially fluctuate, and hence do not constitute a force which tends to wobble or thrash said center shaft rear bearing support 59. And the secondary coupling force created at the output (rear) side of the fourth Hooke joint 57 is imparted through the differential casing 60 to the differential mounts DM, and hence does not substantially act upon the center shaft rear bearing support 59.

Accordingly, the primary forces which wobble the center shaft rear bearing support 59 are the secondary coupling force at the output (rear) side of the second Hooke joint 53 and the secondary coupling force at the input (front) side of the fourth Hooke joint 57. These forces tend to impel said center shaft rear bearing support 59 in the same direction, and accordingly the present inventive entity has conceived that it should be effective, in order to minimize the wobbling effect at said center shaft rear bearing support 59, to offset by a phase angle of 90° the rotational phase of said forces. In line with this, it is considered that, in order as described above to cause the phases of the secondary coupling force created at the output side of the second Hooke joint 53 and of the secondary coupling force created at the input side of the fourth Hooke joint 57 to be offset by 90°, it is required to set said second Hooke joint 53 and said fourth Hooke joint 57 to have equivalent phases.

Further, there is a strong requirement at this time to minimize the rotational fluctuations due to the joint angles, and accordingly it is considered to be desirable that the first Hooke joint 51 should be set to have a phase opposite to the common phase of said second Hooke joint 53 and said fourth Hooke joint 57.

Next, a consideration of the forces acting on the center shaft front bearing support 58 from the point of view of the equilibrium of the rotational movement of the center shaft rear bearing support 59 indicates that the distance $l_2$ between the third constant velocity joint 55 and the center shaft rear bearing support 59 (as indicated in the figures) is much shorter than the distance between the distance L between said center shaft front bearing support 58 and the center shaft rear bearing support 59, and accordingly the primary forces which wobble the center shaft front bearing support 58 are the secondary coupling force at the output (rear) side of the first Hooke joint 51 and the secondary coupling force at the input (front) side of the second Hooke joint 53. These forces tend to impel said center shaft front bearing support 58 in opposite directions, and accordingly the present inventive entity has conceived that it should be effective, in order to minimize the wobbling effect at said center shaft front bearing support 58, to arrange the phases of said first Hooke joint 51 and of said second Hooke joint 53 so as to cause mutual cancellation of said forces. In line with this, it is considered to be required to set said first Hooke joint 51 and said second Hooke joint 53 to have phases offset from one another by 90°. This agrees with the conclusion come to above relating to minimizing of the wobbling effect on the center shaft rear bearing support 59.

Thus, in summary, in the shown case when a constant velocity type universal joint (55) is utilized for the third propeller shaft joint in a three part propeller shaft assembly and Hooke joints are utilized for the other three propeller shaft joints, it is considered that a great reduction in the wobbling couples imposed upon the center shaft front and rear bearing supports may be realized by arranging the first Hooke joint (51) and the second Hooke joint (53) to have opposite phases, i.e. to be 90° apart, and by arranging the second Hooke joint (53) and the fourth Hooke joint (57), which are the ones flanking said third constant velocity joint (55) to have the same phase.

It should be noted that the variation in the angular velocity at the input side and at the output side of each of the Hooke joints 51, 53, and 57 will follow a sine wave shape according to the rotational phase (rotational angle) of the yoke element of said Hooke joint. As a result, the rotational fluctuation ratio on the input side and on the output side in a three part propeller shaft assembly of the construction generally described above will vary according to the phase combination for the first Hooke joint 51 and the second Hooke joint 53, and also according to the phase combination for the second Hooke joint 53 and the fourth Hooke joint 57. Accordingly, the present inventive entity conducted an investigation into the matter of wobbling of the center shaft front and rear bearing supports in five different three part propeller shaft assemblies of the construction generally described above, utilizing different phase combinations for the first, the second, and the fourth Hooke joints 51, 53, and 57, in order to provide an analysis based upon the kinematic principles of Hooke joints.

The phases of the various joints in each case were as shown in the following table:

| Prop. shaft | J51 | J53 | J55 | J57 |
|---|---|---|---|---|
| Present Invention | 90° | 0° | VL | 0° |
| Comparison Example 1 | 90° | 0° | VL | 90° |
| Comparison Example 2 | 90° | 0° | VL | 45° |
| Comparison Example 3 | 90° | 0° | VL | 15° |
| Comparison Example 4 | 90° | 0° | VL | −15° |
| Comparison Example 5 | 0° | 0° | VL | 0° |

In this table, the phases of the first Hooke joint 51, of the second Hooke joint 53, (not of the third constant velocity point 55 of course, since this is a constant velocity joint), and of the fourth Hooke joint 57, are shown, for each of the cases concerned. An analysis was performed under conditions of fixed input torque, and joint angles of the first through the fourth joints at −5=, +5°, +5°, and −5°, respectively.

Figure 7:
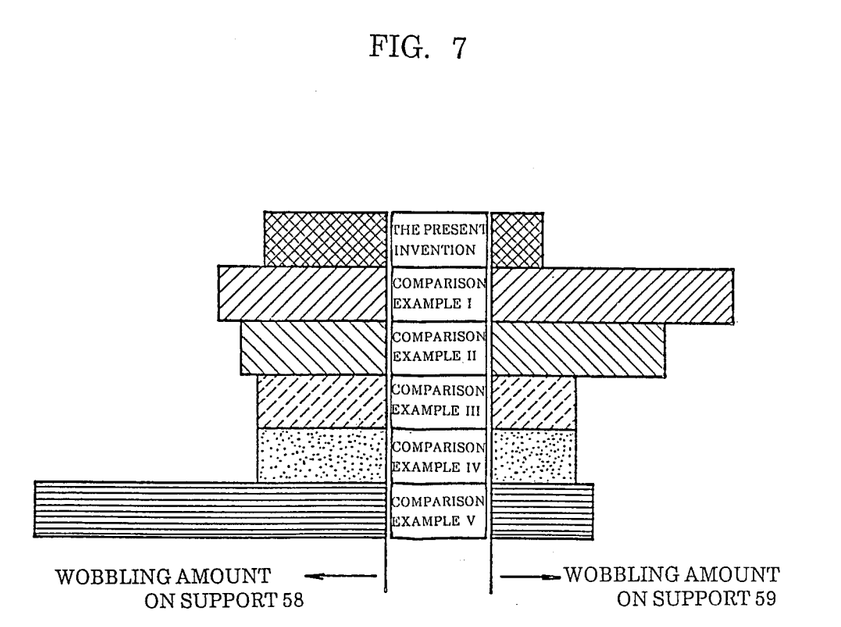
FIG. 7 is a two sided bar chart, showing the results of tests contrasting the effectiveness of said first preferred embodiment of the three part propeller shaft assembly according to the present invention with the performance of various comparison three part propeller shaft assemblies which are not embodiments of the present invention.

The results are shown in the double bar chart of FIG. 7. For each case, the left side of the figure shows the wobbling amount of the center shaft front bearing support 58, while the right side of the figure shows the wobbling amount of the center shaft rear bearing support 59.

As will be clear upon consideration of these results, the three part propeller shaft assembly according to the present invention provides a great reduction in the amount of wobbling and vibration imposed upon the center shaft front bearing support 58 and upon the center shaft rear bearing support 59, in comparison to the Comparison Examples 1 through 5.

Further, the present inventive entity conducted a set of comparison experimental tests between the three part propeller shaft assembly of the present invention and the five comparison examples described above, and thereby concretely confirmed the effectiveness of the present invention.

Figure 8:
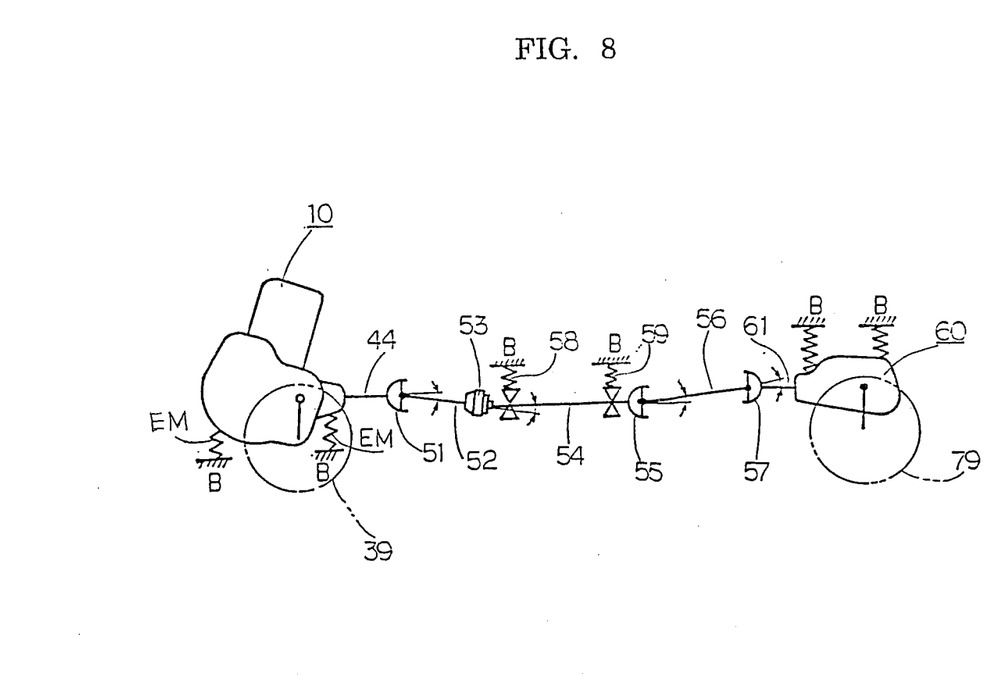
FIG. 8 is a schematic skeleton side view, similar to FIG. 1 for the first preferred embodiment, showing the second preferred embodiment of the three part propeller shaft assembly of the present invention, also as fitted to the power train of an automotive vehicle.

In FIG. 8, there is presented a view, similar to FIG. 1 for the first preferred embodiment of the second preferred embodiment of the three part propeller shaft assembly of the present invention, also shown as fitted to the power train of an automotive vehicle; in this figure, like parts to parts illustrated in FIGS. 1 through 7 are denoted by like reference numerals. In this second preferred embodiment, it is the second propeller shaft joint 53, taken in order from the front of the vehicle rearwards, for which a constant velocity joint of the VL type is utilized; and it is the first, the third, and the fourth joints 51, 55, and 57 which are Hooke joints. The first and third Hooke joints 51 and 55 are set to have phase angles which are the same-said first and third Hooke joints 51 and 55 being those ones which flank the second constant velocity joint 53, i.e. lie on either side thereof-and the fourth Hooke joint 57 is set to have a phase 90° away from said identical phase angle of said and third Hooke joints 51 and 55. In this embodiment, the amount of wobbling and vibration imposed upon the center shaft front bearing support 58 and upon the center shaft rear bearing support 59 is again minimized, for reasons which are the same as in the case of the first preferred embodiment, mutatis mutandis.

Thus, according to the first embodiment of the present invention as an example, in which it is the second joint which is a Hooke joint and the third joint which is a constant velocity type joint, the principal forces which tend to wobble the rear center shaft bearing support are a secondary couple on the output side of the second universal joint and a secondary couple on the input side of the fourth universal joint, and these forces push the rear center shaft bearing support in the same direction; and, since the second Hooke joint and the fourth Hooke joint are set to the same phases, the phases of the output side secondary couple and the input side secondary couple are offset by 90°, and accordingly these forces tend to cancel one another out, and thus the wobbling vibration and noise due to secondary force couples on the rear center shaft bearing support is minimized. Further, the principal forces which tend to wobble the front center shaft bearing support are a secondary couple on the output side of the first universal joint and a secondary couple on the input side of the second universal joint, and these forces push the front center shaft bearing support in opposing directions. Since the first Hooke joint and the second Hooke joint are set to have phases offset by 90°, the phases of the output side secondary couple and the input side secondary couple are offset by 90°, and accordingly these forces tend to cancel one another out, and thus the wobbling vibration and noise due to secondary force couples on the front center shaft bearing support, also, is minimized. Thereby, it is also possible to set the spring constants of two elastic center shaft bearing supports for the center propeller shaft element to be relatively low, which enables the reduction of noise such as booming noise in the passenger compartment and further increases the durability of said two elastic center shaft bearing supports for the center propeller shaft element. Further, the same advantages are also obtained in the case of the second preferred embodiment, which is a reversed form of construction.

Although the present invention has been shown and described in terms of several preferred embodiments thereof, and with reference to the appended drawings, it should not be considered as being particularly limited thereby. The details of any particular embodiment, or of the drawings, could be varied without, in many cases, departing from the ambit of the present invention. For example, the present invention could be applied to a vehicle of the four wheel drive type in which the engine was disposed in the rear of the vehicle, or to a vehicle with a longitudinally mounted engine. Further, for the slide type constant velocity joint, not only can the so called Cross Groove Universal joint or VL (V type loose) joint, which was employed in the shown first and second preferred embodiments of the present invention, be used, but also a tripod type joint or a double offset type joint may be used. Accordingly, the scope of the present invention is to be considered as being delimited, not by any particular perhaps entirely fortuitous details of the disclosed preferred embodiments, or of the drawings, but solely by the legitimate and properly interpreted scope of the accompanying claims, which follow.

What is claimed is:

1. In a vehicle having a body that contains a means for providing rotational power and a means for receiving rotational power and transmitting it to a road surface, a three-part type propeller shaft assembly including:

a first propeller shaft element, a second propeller shaft element, and a third propeller shaft element;

a first joint, which is a Hooke joint, and which rotationally couples said means for providing rotational power to one end of said first propeller shaft element;

a second joint, which rotationally couples the other end of said first propeller shaft element to one end of said second propeller shaft element;

a third joint, which rotationally couples the other end of said second propeller shaft element to one end of said third propeller shaft element;

a fourth joint, which is a Hooke joint, and which rotationally couples the other end of said third propeller shaft element to said means for receiving rotational power and transmitting it to a road surface; and two means respectively disposed near each end of said second propeller shaft element for rotatably supporting said second propeller shaft element from said body, wherein the improvement comprises:

one of said second joint and said third joint being a Hooke joint, and the other being a constant velocity type joint; and the phase of the two said Hooke joints which flank said constant velocity type joint on either side being set to be the same, while the phase of the remaining Hooke joint is set to differ by 90° from said common phase.

2. A three part type propeller shaft assembly according to claim 1, wherein said second joint is a Hooke joint, and said third joint is a constant velocity type joint.

3. A three part type propeller shaft assembly according to claim 1, wherein said third joint is a Hooke joint, and said second joint is a constant velocity type joint.

4. A three part type propeller shaft assembly according to any one of claims 1 through 3, wherein said constant velocity joint is a slide type constant velocity joint.

5. A three part type propeller shaft assembly according to any one of claims 1 through 3, wherein said constant velocity joint is a Cross Groove Universal joint.

6. A three part type propeller shaft assembly according to any one of claims 1 through 3, wherein said constant velocity joint is a tripod type joint.

7. A three part type propeller shaft assembly according to any one of claims 1 through 3, wherein said constant velocity joint is a double offset type joint.

* * * * *

UNITED STATES PATENT AND TRADEMARK OFFICE
CERTIFICATE OF CORRECTION

PATENT NO. : 4,771,842
DATED : September 20, 1988
INVENTOR(S) : Yasuhiko MISHIO et al It is certified that error appears in the above-identified patent and that said Letters Patent is hereby corrected as shown below:

| Column | Line | |
|---|---|---|
| 9 | 21 | change "face" to --race--. |
| 9 | 58 | change "18a" to --81a--. |
| 9 | 65 | change "secured and" to --secured securely and--. |
| 10 | 40 | change "θ3" to --θ3--. |
| 11 | 8 | after "front" insert --end--. |
| 11 | 10 | change "f1" to --θ1--. |
| 13 | 24 | change "-5=," to ---5°,--. |
| 13 | 46 | after "embodiment" insert --,--. |
| 14 | 30 | after "of" insert --the--. |

Signed and Sealed this

Twenty-seventh Day of June, 1989

Attest:

DONALD J. QUIGG

Attesting Officer          Commissioner of Patents and Trademarks